Oct. 6, 1931.  F. B. PHILBRICK  1,825,978

MULTICIRCUIT TESTING MECHANISM

Filed Oct. 28, 1926  2 Sheets-Sheet 1

INVENTOR
Frederick B. Philbrick
BY
ATTORNEY

Oct. 6, 1931.  F. B. PHILBRICK  1,825,978
MULTICIRCUIT TESTING MECHANISM
Filed Oct. 28, 1926   2 Sheets-Sheet 2

INVENTOR
Frederick B. Philbrick
BY
ATTORNEY

Patented Oct. 6, 1931

1,825,978

UNITED STATES PATENT OFFICE

FREDERICK B. PHILBRICK, OF NEEDHAM, MASSACHUSETTS, ASSIGNOR TO THE GAME-WELL COMPANY, OF NEWTON UPPER FALLS, MASSACHUSETTS, A CORPORATION OF MASSACHUSETTS

MULTICIRCUIT TESTING MECHANISM

Application filed October 28, 1926. Serial No. 144,792.

This invention relates to multi-circuit testing mechanism; and is particularly suited for use in connection with fire alarm and police signal systems in which controlling switchboards are provided for governing the connections between a plurality of working circuits and respective independent duplicate batteries for supplying operating current thereto, whereby one set of the duplicate batteries may be charged or held in reserve while the other set of such duplicate batteries is serving as a current supply for the respective working circuits.

The fire alarm and police signal system switchboards built prior to this invention have, with few exceptions, been equipped with means for obtaining volt meter and ampere meter readings arranged in accordance with Patent No. 668,426, dated February 19th, 1901 or Reissue Patent No. Re. 13,858, dated January 5th, 1915. As indicated by these prior patents, nearly all of the switching mechanism provided upon such fire alarm switchboards is usually of the strap switch type, such as indicated at A, B and C of said Patent No. 668,426 and the switches comprising the arms W1 and W2 of said reissued patent, while the mechanism provided for obtaining meter readings has been either of the jack and plug type or of the sliding block type. Such differences in the types of switching mechanism provided on the same switchboard for more or less similar functions has led to confusion of the operators, especially in those instances when, because of the character of the service, they are called upon to accomplish exact adjustment of circuit conditions with a degree of celerity and exactitude, following the development of abnormal conditions in the signaling circuits, such as to minimize possibility of loss or mutilated signals. Furthermore, the utilization of plugs and spring jacks has been found to result in the development of objectionable conditions such as breakage and short circuiting of flexible conductors in cables connecting the plugs with the meters, because of the repeated bending to which such cables are subjected in the course of ordinary use; accidental interruption of circuits and mutilation of signals because of loss of resiliency of spring contacts, because of corrosion of contact surfaces of plugs and jacks, or because of improper presentation of the plugs to the jacks, when the operators have been acting in haste or under stress of excitement. Correspondingly, the manner of use and complexity of the sliding block type of testing switch facilities has tended to confuse users and involves opportunities for the development of faulty conditions which will result in misleading indications of the meters.

It is an object of this invention to provide multi-circuit testing mechanism suitable for embodiment in switching mechanism of a type corresponding to the type of the other switching mechanism of the switchboard panel and arranged to correspondingly indicate the normality or abnormality of each switching unit.

It is a further object of this invention to provide simple and durable means whereby no unit of such a mechanism can be abnormally positioned while any other unit is abnormally positioned.

Other objects are to provide multi-circuit testing mechanism which can be more economically and conveniently manufactured, used and repaired than similar mechanism heretofore devised.

Other objects of this invention, and the features of construction by which they are attained, will be pointed out hereinafter in connection with the description of the illustrative embodiment of the invention.

For a better understanding of this invention, reference may be had to the accompanying drawings, in which like parts are indicated by like reference characters, and in which.

Figure 1:
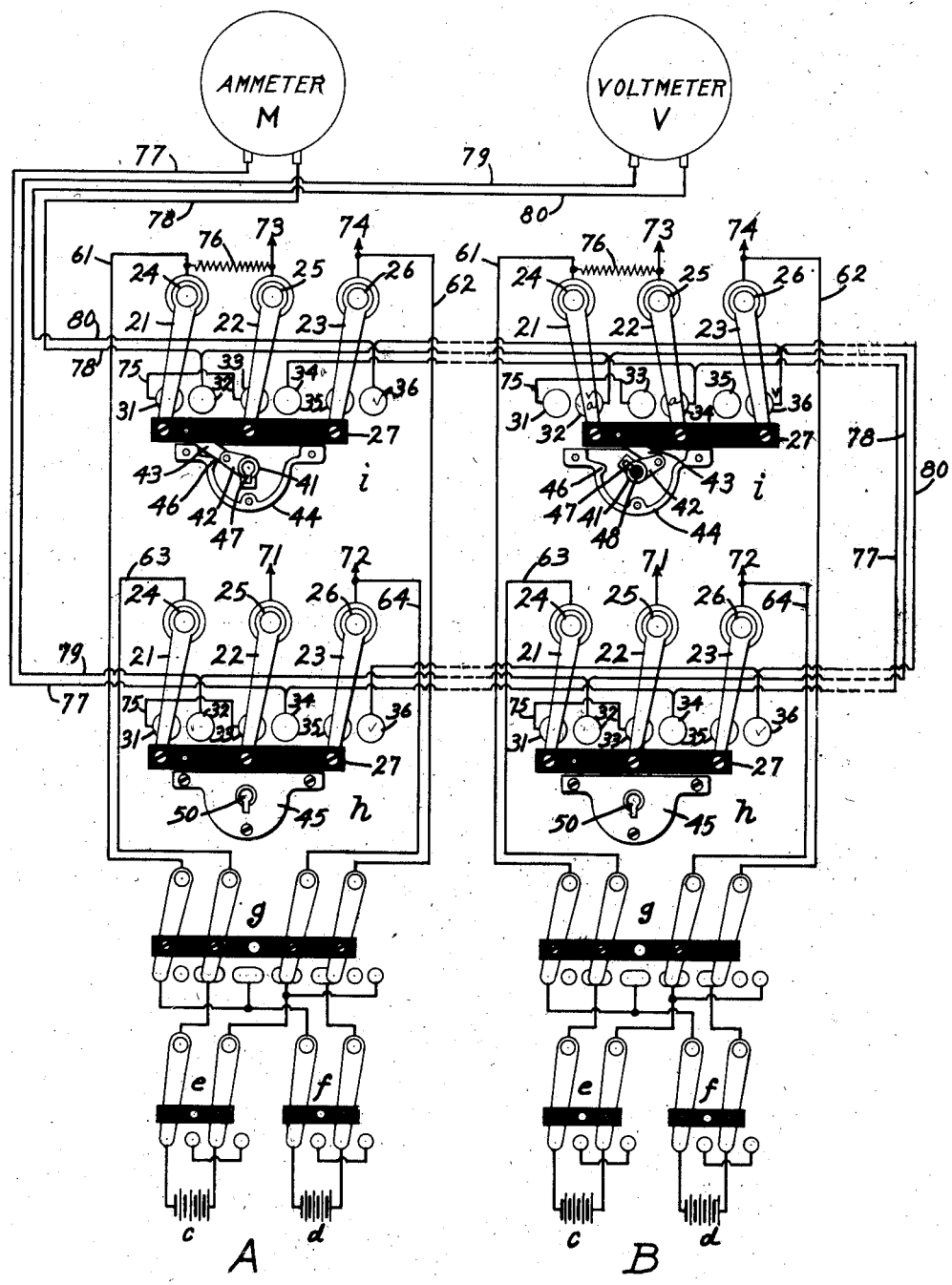
Figure 1 is a diagrammatic representation of a signaling system provided with multi-circuit testing mechanism arranged in accordance with this invention.

The signaling system of Fig. 1 comprises the circuits A and B, with each of which circuits is associated the two batteries $c$ and $d$ which are normally connected through the cut-off switches $e$ and $f$, respectively, to the transposing switch $g$.

The batteries $c$ and $d$ are associated with the switches $e$, $f$ and $g$ in a well known manner such that, when said switch $g$ is in one of its extreme positions the battery $c$ is connected to supply the conductors of a current path ordinarily referred to as a "working line" and the battery $d$ is connected to other conductors usually communicating with what is ordinarily referred to as a "charging line", and when said switch $g$ is in its opposite extreme position the battery $d$ is connected with the "working line" and the battery $c$ is connected with the "charging line"; and the construction and arrangement of said switch $g$ is such that the movement of said switch to transpose relationship of such batteries with the conductors of such lines will be accomplished without at any time depriving the working line of current supply; all for reasons well understood by those skilled in this art.

Associated with each circuit there is provided means for operatively connecting a volt meter and an ammeter with either the working line or charging conductors, such means being here illustratively indicated as the switches generally designated by the letters $h$ and $i$, respectively. Each such connecting means comprises the switch arms 21, 22 and 23 which are pivoted at 24, 25 and 26, respectively, have their free ends connected by the insulating yoke 27, and respectively cooperate with the contacts 31 and 32, 33 and 34, and 35 and 36.

Figure 2:
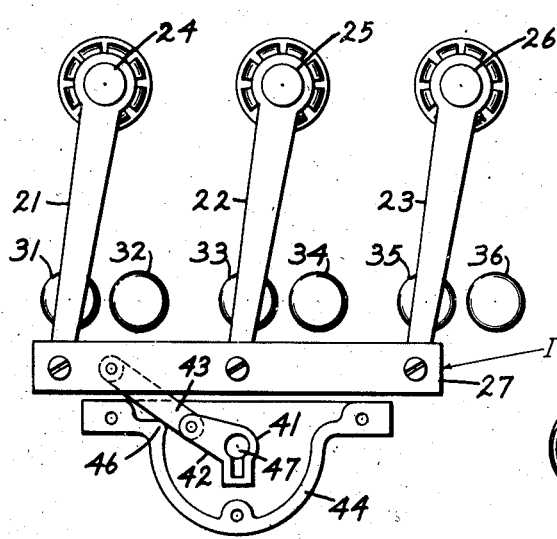
Fig. 2 is a front elevation of one of the switches of Fig. 1 with the actuating mechanism cover removed.
Figure 3:
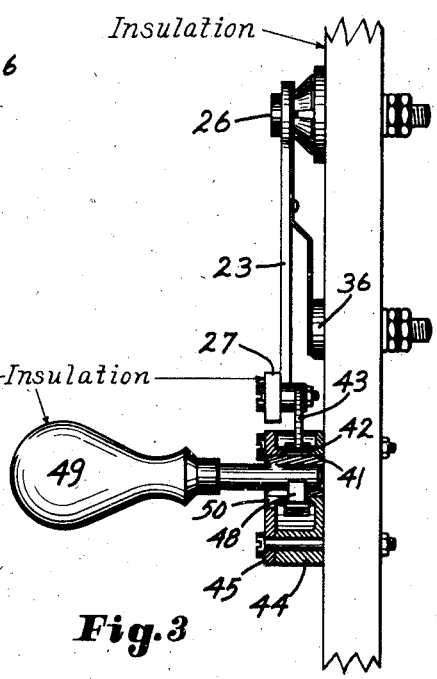
Fig. 3 is a side view, partly in section and partly in elevation, of the mechanism of Fig. 2.

Each such connecting means has mechanism associated therewith for normally retaining same in ineffective condition: such mechanism being here shown as comprising a revoluble part 41 including an arm 42, and a link 43, one end of which link is connected with the free end of said arm and the other end of which link is connected to the yoke 27 (see also Figs. 2 and 3). Said link is so disposed between said arm and said yoke, that they may at times act as a toggle, the central pivot of which will be in substantial alignment with its terminal pivots, and thereby resist movement of said yoke 27 from one of its extreme positions toward the other; and so that rotation of said revoluble part will cause the movement of said yoke for the functional actuation of the associated switch arms 21, 22 and 23, as hereinafter more fully explained.

An enclosure is provided for the revoluble part 41 and arm 42, which enclosure comprises the wall 44 and the cover 45 (see Figs. 1 and 3) and carries an abutment 46, situated in the path of the link 43 so as to cause the rotation of the revoluble part 41, in counter-clockwise direction, to be arrested whenever the pivotal connection between said arm 42 and link 43 has thus been carried slightly beyond a line intersecting the axis of rotation of the revoluble part 41 and the pivotal connection of the link 43 to the yoke 27.

The revoluble part 41 has a recess 47 formed therein suitable for receiving the key-like end 48 of the actuating device 49 (see Fig. 3); and the cover 45 has a key hole opening 50 formed therein for receiving the end 48 of the device 49, said opening 50 being so positioned that when said key-like end 48 is positioned within the recess 47, it can be withdrawn through said opening 50 only when the revoluble part 41 is so positioned as to bring the link 43 into engagement with or close proximity to the abutment 46.

The conductors 61 and 62 connect the switch arms 21 and 23, of each switch $i$, with certain of the arms of switch $g$; and the conductors 63 and 64 correspondingly connect the arms 21 and 23 of switch $h$ with other arms of said switch $g$, so that, as hereinbefore pointed out in greater detail, when the switches $e$ and $f$ are normally positioned, and the switch $g$ is positioned as shown, the terminals of battery $c$ will be connected to said arms 21 and 23 of switch $h$ and the terminals of battery $d$ will be connected to like arms of the switch $i$ so that after the switch $g$ of any circuit has been moved to its extreme right hand position, the terminals of its battery $c$ will be connected to the arms 21 and 23 of its associated switch $i$, and the terminals of its battery $d$ will be connected to the arms 21 and 23 of its associated switch $h$.

Working line conductors 71 and 72 communicate with the switch arms 22 and 23 of each working line conductor, and charging line conductors 73 and 74 correspondingly communicate with the switch arms 22 and 23 of the charging test switch $i$ of each circuit. The contacts 31 and 33 of each of the switches $h$ and $i$ are interconnected by a conductor 75; and the switch arms 21 and 22 of each of the switches $i$ are interconnected by resistance shunt 76, for reasons which will be hereinafter more fully explained.

For convenience both in operation and wiring, it is desirable that the switches $i$ for the various circuits be arranged in a row, and that the switches $h$ for said circuits be placed in a parallel row. When so arranged, the current path for ammeter readings can be readily so routed that the current path through an ammeter may be provided in which length of conductor traversed will be the same, irrespective of which of the switches are operated. As shown, one terminal of the ammeter M is connected through conductor 77, to the contacts 34 of each of the switches $h$, in the order in which they occur, from left to right, and to like contacts of the switches $i$, in the order in which they occur from right to left; and the other terminal of said ammeter M is connected through the conductor 78 with the contacts 32 of said switches in reverse order.

One terminal of the volt meter V is connected through the conductor 79 with the contact 32 of the switch $h$ of circuit A, which is, in turn, connected through the conductor 78 with the corresponding contact of each of the other switches $h$ and $i$, as just explained; and the other terminal of said volt meter is connected through the conductor 80 with the contact 36 of switch $i$ of circuit A, and thence to the corresponding contact of each of the other switches $h$ and $i$.

From the foregoing it will be apparent that, when all the switches $h$ and $i$ are normally positioned (to the left, as shown in Fig. 1) the ammeter M and the volt meter V will be disconnected from all of the circuits and, inasmuch as the arms 21 and 22 of each of the switches $h$ and $i$ will be resting upon their contacts 31 and 33, respectively, such arms of each of said switches will be interconnected through its associated conductor 75.

If, now, the key-like end 48 of the device 49 is inserted through the keyhole 50 of any one of the switches $h$ or $i$, the operation of said device will move such switch from its normal position (as indicated by Fig. 2) to its abnormal position, which corresponds to that in which switch $i$ of circuit B is shown in Fig. 1.

Assuming that said switch $i$ of circuit B is so abnormally positioned, the ammeter M and the volt meter V will be thereby operatively associated with whichever of the batteries $c$ or $d$ is then connected to said switch $i$. The current path thus established for said ammeter M will be in parallel with the resistance shunt 76 associated with said switch $i$, from charging line conductor 73, through switch arm 22, contact 36, and conductor 77 to one terminal of said ammeter, and from the other terminal of said ammeter through conductor 78, contact 32 and switch arm 21 of said switch $i$, and conductor 61 through switch $g$ to one terminal of the battery thereby connected to said switch $i$. Because of the connection thus established, it is evident that a predetermined proportion of the current flow between charging line conductor 73 and the battery with which it is connected will pass through the ammeter and thereby cause suitable indication. The current path established for said volt meter V by abnormal positioning of said switch $i$, as just referred to, will be through conductor 61 from the battery connected with said switch by its associated switch $g$, through switch arm 21 and contact 32 of said switch $i$, thence through conductors 78 and 79 to one terminal of said volt meter, and from the other terminal to said volt meter through conductor 80, contact 36 and arm 23 of said switch $i$, to conductor 62 leading to the battery then associated with said switch $i$ through the switch $g$. While thus connected, it is evident that said volt meter will indicate the difference of potential between the terminals of the battery then associated with the operated switch $i$ through its associated switch $g$.

It will be noted that while the switch $i$ associated with circuit B is thus abnormally positioned, the key-like end 48 of the device 49 will be retained by the cover 45, and, if it is now desired to obtain corresponding readings relative to the battery associated with the charging lines of circuit A, the device 49 must first be turned so as to bring the bit of its key-like end 48 into alignment with the corresponding portion of the keyhole 50 formed in the cover 45 associated with said switch $i$, thereby restoring said switch to its normal position and bringing the pivotal connection between the free end of the arm 42 and the link 43 to a position slightly below a line between the axis of rotation of said arm 42 and that of the point of attachment of said link 43 with the yoke 27. When the parts are thus restored, said switch $i$ of circuit B will be held against accidental or malicious displacement, as by attempting to move same by applying pressure to the left hand end of the yoke 27, and the ammeter and volt meter terminals will be completely disconnected from the conductor 61 and 62.

Corresponding insertion and operation of the keylike end 48 of the device 49 in the keyholes of the other switch $h$ and $i$ will similarly associate said volt meter and ammeter with the respective ones of the other batteries, without thereby at any time causing or permitting the establishment of any interconnection between the working lines of any two circuits, between the charging lines of any two circuits, or between any working line and a charging line.

Having described my invention, what I claim and desire to secure by Letters Patent of the United States of America is:

1. In a storage battery system having a plurality of independent working circuits each having a charging battery and a discharging battery,—a volt meter, an ammeter, means operable for simultaneously connecting said volt meter and ammeter with either the charging or discharging battery of any circuit, comprising three pole switches each associated with a respective one of said charging or working batteries, mechanism associated with each switch for retaining same in ineffective condition, and means whereby said switches may be individually moved to effective position only when all of the other of said switches are ineffectively positioned.

2. In combination, a plurality of circuits, each including a current source, means associated with each circuit for operatively connecting an ammeter in series therewith and a volt meter across the terminals of the current source therefor, mechanism associated with each such means for normally retaining same in ineffective condition, and means for actuating said mechanism to permit effective conditioning of the first named means associated with any circuit only during ineffective conditioning of the associated means of all other circuits.

3. In combination, a plurality of circuits, each including a current source, means associated with each circuit for operatively connecting an ammeter in series therewith and a volt meter across the terminals of the current source therefor, mechanism associated with each such means for normally retaining same in ineffective condition and operable for effectively conditioning said means, a device suited for association with any one of said operating mechanisms for actuating same to either effectively or ineffectively condition its associated means, and means for preventing disassociation of said device from any one of said operating mechanisms other than during ineffective conditioning of the associated means.

4. In combination, a plurality of circuits, means associated with each circuit for operatively connecting an ammeter in series with and a volt meter across such circuit, mechanism associated with each such means for normally retaining same in ineffective condition and operable for effectively conditioning said means, a device suited for association with any one of said operating mechanisms for actuating same to either effectively or ineffectively condition its associated means, and means for preventing disassociation of said device from any one of said operating mechanisms other than during ineffective conditioning of the associated means.

In witness whereof, I hereunto subscribe my name, this 22d day of October, 1926.

FREDERICK B. PHILBRICK.